Patented Dec. 20, 1927.

1,653,087

UNITED STATES PATENT OFFICE.

HENRYK COHN AND CONRAD SIEBERT, OF BERLIN, GERMANY.

PROCESS OF PRODUCING A COLLOIDAL SILVER-TANNIN-ALBUMEN COMBINATION SOLUBLE IN WATER.

No Drawing. Application filed December 28, 1926, Serial No. 157,612, and in Germany March 14, 1923.

This invention relates to a process of producing a colloidal silver-tannin-albumen combination easily soluble in water, which is capable of being sterilized easily.

Tannin-albumen combinations have already been prepared for therapeutic purposes, which are, however inapplicable in many cases, for the reason that they are absolutely insoluble in water. The manufacture of such products, for instance the tannalbin, takes place with the intention of producing a medicament which should only be absorbed in alkaline-reacting intestines.

Silver-tannin combinations have, furthermore, been manufactured from vegetable extracts rich in tannic acid, such as for example *Extractum Ratanhiae*. These combinations are slightly soluble in water, are unstable under the action of heat and are therefore not capable of being sterilized which greatly limits their range of application in therapeutics.

Already known combinations consisting of albumen, tannin and silver are insoluble in water. Even when alkalies in such quantities are added that the compound is no longer applicable in therapeutics, only traces of it pass into solution.

These preparations are quite unsuitable for disinfecting the urethra, as well as for flushings, for instance flushings of the bladder.

Silver-albumen combinations have likewise been produced and employed in therapeutics to a large extent. These bodies also dissolve in water with difficulty.

The present invention consists of a process of producing a combination which contains tannic acid as well as albumen and silver in colloidal form, is easily soluble in water and is stable at high temperatures, so that it is suitable for therapeutic purposes, particularly for intravascular injections.

The invention is based upon the recognition, that it is possible, to produce a stable product containing the desired constituents and easily soluble in water by dissolving tannin-ester, for instance diacetyltannin, a product soluble in an alkaline solution, in that solvent and mixing it with a watery solution of silver-albumen. The product of this process is the desired tannic acid-silveralbumen combination.

Research has proved that the diacetyl-tannin-silver-albumen will not only adhere to the surface to be treated but also penetrate to some depth, a quality which none of the known silver-albumen combinations possess and which justifies the assumption that the diacetyltanninsilveralbumen has a more lasting and thus a deeper reaching disinfecting action than any other similar preparation.

The diacetyltanninsilveralbumen is further distinguished by the fact that it has no irritating effect, which is the more remarkable as it is well known that mucous membranes and in particular that of the urethra is extremely sensitive to pure tannin so that it has been altogether abandoned for the treatment of gonorrhoea, for instance.

*Example.*

5 g. diacetyltannin are dissolved in an alkaline solution, for instance a solution of carbonate of soda. To this solution is added a watery solution containing 10 g. of silver-albumen. No precipitation takes place. The product is carefully concentrated (in vacuo). Scales or lamels are produced of a beautiful metallic lustre of a dark tint, which represent the stable product, easily soluble in water and capable of being sterilized.

The product of the process may with advantage be employed in all cases in which combinations of silver are used in therapeutics and particularly for the treatment of gonorrhoea.

Various changes and modifications may be made in the process without departing from the spirit of the invention and we desire, therefore, that the claims be limited by the state of the art only.

We claim:

1. The process of producing a colloidal silver-tannin-albumen combination soluble in water, which consists in bringing a silver-albumen solution into reaction with an alkaline solution of tannin esters.

2. The process of producing a colloidal silver-tannin-albumen combination soluble in water, which consists in dissolving diacetyltannin in a solution of carbonate of soda, adding a watery solution of silver-albumen, and concentrating the mixture carefully.

3. As a new article of manufacture, a silver-tannin-albumen combination easily soluble in water, stable even at high temperatures and capable of being sterilized.

In testimony whereof we hereunto affix our signatures.

CONRAD SIEBERT.
HENRYK COHN.